3,660,388
BIS-DIOXO-MORPHOLINE DERIVATIVES BIS[2,6 DIOXOMORPHOLINYL-(4)]PHENYLENES AND ALKYLENES
Joachim Dazzi, Riehen, Switzerland, assignor to Ciba-Geigy Corporation, Ardsley, N.Y.
No Drawing. Continuation-in-part of application Ser. No. 688,667, Dec. 7, 1967. This application Apr. 3, 1970, Ser. No. 25,591
Claims priority, application Switzerland, Dec. 14, 1966, 17,930/66
Int. Cl. C07d 87/42
U.S. Cl. 260—246 B                8 Claims

ABSTRACT OF THE DISCLOSURE

Certain bis-dioxo-morpholino derivatives in which the nitrogen atoms of the two morpholino nuclei are linked with each other via a bridge member which is an alkylene radical optionally interrupted by hetero atoms or by carbocyclic or heterocyclic radicals, or which is an arylene or cycloalkylene radical, are described as useful in the curing of epoxy groups-containing organic compounds. Their production comprises the reaction of a diimino-tetracarboxylic acid in which the two imino nitrogen atoms are linked by the same bridge member as defined above, with an anhydride of an organic monocarboxylic acid or a ketene.

CROSS-REFERENCES

This is a continuation-in-part of copending application, Ser. No. 688,667, filed Dec. 7, 1967.

DESCRIPTION OF THE INVENTION

The present invention concerns new bis-carboxylic acid anhydrides.

It has been found that bis-carboxylic acid anhydrides are obtained when a tetracarboxylic acid of Formula I

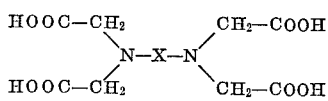

(I)

wherein

X represents an alkylene radical having 2 to 20 carbon atoms, wherein the chain of such alkylene is uninterrupted or interrupted by oxygen, sulfur, —N-alkyl having 1 or 2 carbon atoms unsubstituted or substituted by —COOH, cyclohexylene, piperazinylene, phenylene or phenylene substituted by methyl, or represents phenylene, cyclohexylene, unsubstituted diphenylene, diphenylene substituted by methoxy groups, dicyclohexylene, cyclohexylene-Y-cyclohexylene or phenylene-Y-phenylene wherein Y represents oxygen, sulfur, alkylene having 1 to 3 carbon atoms, —SO₂ or —CO—, is reacted at temperatures below 150° C., and in the presence of the anhydride of an organic monocarboxylic acid and, optionally, in the presence of a tertiary nitrogen base, to form a bis-[2,6-dioxo-morpoholinyl-(4)] compound of Formula II

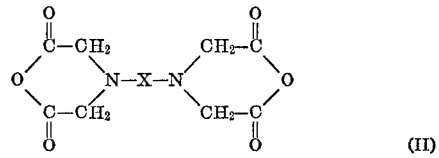

(II)

wherein X has the meaning given in Formula I.

Alkylene radicals are cheifly the 1,2-ethylene, 1,2-dimethyl-1,2-ethylene, 1,2- or 1,3-propylene, 1,4-butylene, 1,6-hexylene, 1,12-dodecylene or 1,20-eicosylene radical. If these alkylene radicals are interrupted by hetero atoms, preferably by at most 3 hetero atoms, then this is by oxygen, sulfur or nitrogen atoms. Examples of such radicals are the 3-oxa-, 3-thia- or 3-aza-1,5-pentylene radical, there being advantageously another substituent such as an alkyl group at the aza-nitrogen atome, preferably alkyl having 1 or 2 carbon atoms, such as methyl or ethyl which is unsubstituted or substituted by the carboxy group. Alkylene radicals can also be interrupted by phenylene or cyclohexylene radicals, the rings can be further substituted e.g. by alkyl groups of 1 or 3 carbon atoms such as methyl or ethyl. The alkylene radicals can also be interrupted by heterocyclic radicals, such as diazines, e.g. piperazinylenes, preferably 1,4-piperazinylene.

The organic radical X, however, can also represent an arylene radical, e.g. a mononuclear arylene radical such as phenylene, preferably the 1,3- or 1,4-phenylene radical, or a polynuclear, non-condensed arylene radical, e.g. diphenylene, which can be unsubstituted or substituted by methoxy groups or e.g. of the formula phenylene-Y₂-phenylene wherein Y₂ represents oxygen, alkylene having 1 to 3 carbon atoms such as methylene or ethylene, —SO₂— or —CO—. Examples of such radicals are the 4,4'-diphenyl, 4,4'-diphenyl ether, 4,4'-diphenyl thioether, 3,3'- or 4,4'-diphenyl sulphone, 4,4'-diphenyl methane, 4,4'-diphenyl-β,β-propane or 4,4'-diphenyl ketone radical.

When X is a cycloalkylene radical then it is, e.g. a mononuclear radical such as cyclohexylene, preferably the 1,3- or 1,4-cyclohexylene radical, or it is a non-condensed, polynuclear radical e.g. dicyclohexylene or e.g. of the formula cyclohexylene-Y₁-cyclohexylene wherein Y₁ represents alkylene having 1 to 3 carbon atoms, such as methyl or ethyl, oxygen or sulfur. Examples of such radicals are the 4,4'-dicyclohexylmethane or 4,4'-dicyclohexyl ether radical.

Preferably X is an alkylene radical, chiefly the 1,2-ethylene radical, or a phenylene radical such as the 1,3- or 1,4-phenylene radical.

The starting compounds of Formula I are produced by carboxymethylating a diamine of the formula

optionally, any secondary amino groups present as components of the organic radical X are also carboxymethylated.

Anhydrides of organic monocarboxylic acids usable in the process according to the invention are, chiefly, those of aliphatic monocarboxylic acids. Anhydrides of fatty acids having 2 to 4 carbon atoms are particularly suitable, i.e., for example, acetic acid, propionic acid or butyric acid anhydride; however, also anhydrides of aromatic monocarboxylic acids, e.g. benzoic acid anhydride, or mixed organic monocarboxylic acid anhydrides such as formic acid/acetic acid anhydride or aliphatic ketenes such as ketene proper, can be used according to the invention. Preferably acetic acid anhydride is used.

The reaction of the tetracarboxylic acid of Formula I to form the bis-[2,6-dioxo-morpholinyl-(4)] compound of Formula II is advantageously performed between room temperature and below the decomposition point of the tetracarboxylic acid, i.e. at 10° up to about 150° C. and preferably up to 130° C. It is also advantageously performed in an excess of the monocarboxylic acid anhydride which serves at the same time as solvent or diluent. The use of a tertiary nitrogen base or mixtures thereof in the reaction is of advantage as it accelerates the reaction and improves the yields. The stronger the base is, the quicker the reaction proceeds. Particularly active bases are pyridine as well as alkylated pyridines in which at least one of the 2- and 6-positions is unsubstituted, N-alkyl morpholines, e.g. N-methyl morpholine, as well as trialkylamines such as triethylamine or tributylamine, or also triethylenediamine.

In those syntheses in which the starting materials as well as the final product are only slightly soluble in the monocarboxylic acid anhydride, it is advantageous to employ an oscillatory stirrer in lieu of an ordinary stirrer as used in industrial chemical synthesis. Such oscillatory stirrers, for instance a Vibro-mixer manufactured by A. G. für Chemie Apparatebau at Männedorf, Zürich, Switzerland, have no rotating parts but a vibrating table, the oscillations of which correspond to the frequency of the alternating current used to operate the mixer, e.g. 50 or 60 cycles. In such apparatus the reaction time can be shortened to a few minutes, the time being the shorter, the higher the reaction temperature. This makes it possible to produce the dianhydrides also by the continuous process.

High, in some cases even quantitative, yields of end products of Formula II of remarkable purity are obtained by the process according to the invention.

The new bis-[2,6-dioxo-morpholinyl-(4)] compounds of Formula II are suitable for the curing of epoxy resin precursors which can contain, e.g. 1 to 5 epoxy groups per molecule, for example, for the curing of glycidyl ethers such as penta-2,3-epoxypropyl ether of 2,2,6,6-tetramethylol cyclohexanol, of epoxy alkyloxyphenyl alkanes, e.g. of 2,2-bis-[p-(2,3-epoxy)-propyloxyphenyl]-propane ("Araldit F," Ciba, Basle, cf. Chimia 19, 360 (1965)), of epoxy alkyl epoxy cycloalkanes such as 1-epoxyethyl-3,4-epoxy-cyclohexane ("vinyl cyclohexene dioxide"), or of dialkene dioxides such as dipentene dioxide ("limonene dioxide"), as well as of 3,4-epoxy-6-methyl-cyclohexyl-methyl adipate or 3,4-epoxy-cyclohexyl-3',4'-epoxyhexahydrobenzoate. These compounds are cured with the bis-[2,6-dioxo-morpholinyl-(4)] compounds of Formula II by heating both substances in the presence of a tertiary organic nitrogen base, particularly in the presence of a trialkylamine, of which tributylamine has proved to be the best.

The advantage of the new compounds of Formula II over pyromellitic acid dianhydride which has been used previously for the curing of epoxy resins lies in their many times reduced hygroscopicity which makes them able to be stored better and enables better control of the curing process. In addition, the bis-carboxylic acid anhydrides according to the invention are faster to sublimation than pyromellitic acid dianhydride and, in some epoxy compounds, e.g. in not fully condensed epoxy resins, they are better soluble in the presence of tertiary amines.

It is well known that the amount of curing agent required for curing epoxy resin depends on the number of epoxy groups present per molecule of the resin, and is usually 0.4 mol or more of tetracarboxylic acid dianhydride-type curing agent per mol of epoxy group (16 g.).

In the case of curing agents according to the invention, smaller amounts of down to 0.005 mol (in gram) for every mol (16 g.) of epoxy groups present in the gram-mol of the resin were found to be satisfactory. An amount of about 0.01 to about 0.1 mol of curing agent according to the invention per epoxy group (gram-mol) depending on the solubility of the curing agent in the epoxide monomer, is preferred.

The following examples illustrate the invention. The temperatures are given therein in degrees centigrade.

EXAMPLE 1

1,2-bis-[2,6-dioxo-morpholinyl-(4)]-ethane

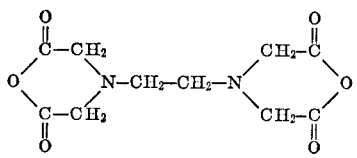

364 g. of ethylenediamine-N,N,N',N'-tetraacetic acid, 510 g. of acetic acid anhydride and 600 g. of pyridine are stirred for 24 hours at 65°. The reaction mixture becomes orange coloured but a clear solution is not formed. The mixture is filtered at 24° and the residue is washed with acetic acid anhydride and then with diethyl ether and dried at 60° under 12 torr. 307 g. of 1,2-bis-[2,6-dioxo-morpholinyl-(4)]-ethane are obtained as white crystals which melt at 195°. The yield is 96.0%, calculated on the ethylenediamine-N,N,N',N'-tetraacetic acid. Another 5.8 g. of 1,2-bis-[2,6-dioxo-morpholinyl-(4)]-ethane crystallise from the filtrate after a few days. Thus, the yield is, for all practical purposes, quantitative.

Analysis.—($C_{10}H_{12}N_2O_6$); molecular weight: 256.21. Calculated (percent): C, 46.87; H, 4.73; N, 10.93; O, 37.47. Found (percent): C, 46.71; H, 4.65; N, 10.93, O, 37.29.

By repeating Example 1, but using in lieu of a normal stirrer having a vertical shaft and blades, an oscillatory mixer as mentioned hereinbefore, and heating the 364 g. of ethylenediamine-N,N,N',N'-tetraacetic acid at 120° under a nitrogen atmosphere, and by adding the preheated pyridine and acetic acid anhydride very rapidly, the reaction is completed at the said temperature within 5 minutes; the reaction mixture is then cooled rapidly and processed further as described in the above example. 309 g. of 1,2-bis-[2,6-dioxomorpholinyl-(4)]-ethane are thus obtanied (yield rate 96.7%).

The above final product is also obtained in a yield rate of 92.1% by the following procedure:

58.4 g. of ethylenediamine-N,N,N',N'-tetraacetic acid and 247 g. of pyridine are mixed and heated with stirring at 65° for 20 hours. During this time, ketene is introduced into the reaction mixture. The excess of ketene is then expelled from the mixture by passing nitrogen therethrough, and the mixture is then further processed to isolate the said final product in the same manner described above.

EXAMPLE 2

19.3 g. of ethylenediamine-N,N,N',N'-tetraacetic acid, 86 g. of propionic acid anhydride and 26 g. of pyridine are stirred for 48 hours at 60° and then work up as described in Example 1. 15.9 g. of 1,2-bis-[2,6-dioxo-morpholinyl-(4)]-ethane are obtained; yield 93.3%.

Similar results are obtained when the 26 g. of pyridine are replaced by equimolar amounts of 5-ethyl-2-methyl pyridine or tributylamine.

EXAMPLE 3

A mixture consisting of 29.2 g. of ethylenediamine-N,N,N',N'-tetraacetic acid, 113 g. of benzoic acid anhydride and 247 g. of pyridine is stirred for 96 hours at 65°. The isolated reaction product contains about 40% of 1,2-bis-[2,6-dioxo-morpholinyl-(4)]-ethane (calculated on the amount of ethylenediamine-N,N,N',N'-tetraacetic acid) used, in addition to the starting material.

EXAMPLE 4

44 g. of ethylenediamine-N,N,N',N'-tetraacetic acid, 153 g. of acetic acid anhydride and 54 g. of pyridine are stirred for 10 hours at 60° whereupon the reaction mixture is filtered. As residue, 35.8 g. of 1,2-bis-[2,6-dioxo-morpholinyl-(4)]-ethane are obtained in a yield of 93.3%.

Without being distilled, the filtrate is then stirred with 41 g. of ethylenediamine-N,N,N',N'-tetraacetic acid for 24 hours at 60° and this mixture is then filtered. As residue, 32.3 g. of 1,2-bis-[2,6-dioxo-morpholinyl-(4)]-ethane are obtained in a yield of 89.9%.

140 g. of the filtrate which has already been used are heated for 28 hours at 60° with 29.2 g. of ethylenediamine-N,N,N',N'-tetraacetic acid and this mixture is then filtered. 22.7 g. of 1,2-bis[2,6-dioxo-morpholinyl-(4)]-ethane are obtained as residue in a yield of 88.2%. This filtrate is then heated once more at 65° for 38 hours with 29.2 g. of ethylenediamine - N,N,N',N' - tetraacetic acid and then worked up as described above. 22.8 g. of 1,2-bis-[2,6-dioxo-morpholinyl-(4)]-ethane are obtained. The yield is 89.0%. The 1,2-bis-[2,6-dioxo-morpholinyl-(4)]-ethane is, for all practical purposes, colourless in spite of the fact that the mixture of acetic acid anhydride/pyridine/acetic acid used for the synthesis thereof has already been used three times previously without any intermediate purification.

Similar results are obtained when the pyridine is replaced by 5-ethyl-2-methyl pyridine or by N-methyl morpholine.

EXAMPLE 5

29.2 g. of ethylenediamine-N,N,N',N'-tetraacetic acid, 104 g. of acetic acid anhydride and 40 g. of N-methyl morpholine are stirred for 1 hour at 60° and worked up as described in Example 1. 24 g. of 1,2-bis-[2,6-dioxo-morpholinyl-(4)]-ethane are obtained which corresponds to a yield of 93.4%.

On using an equimolar amount of triethylamine instead of the 40 g. of N-methyl morpholine the same end product is obtained after three hours with otherwise the same procedure as given in this example. The yield is 88.1%.

When the mixture is heated at 25° instead of 60° and otherwise the procedure given in this example is followed, then after 23 hours reaction time, the same end product is obtained in a yield of 95%.

EXAMPLE 6

29.2 g. of ethylenediamine-N,N,N',N'-tetraacetic acid, 104 g. of acetic acid anhydride and 80 g. of N-methyl morpholine are stirred at 25°. After 10 hours, the reaction to form 1,2-bis-[2,6-dioxo-morpholinyl - (4)] - ethane is complete. The latter is worked up as described above. The yield is 96.1%.

EXAMPLE 7

21.8 g. of ethylenediamine-N,N,N',N'-tetraacetic acid, 78 g. of acetic acid anhydride and 16.9 g. of triethylenediamine are stirred at 60°. Already after 1 hour, 17.1 g. of 1,2-bis-[2,6-dioxo-morpholinyl-(4)]-ethane is obtained by filtration which corresponds to a yield of 89.1%.

Instead of the 16.9 g. of triethylenediamine, equimolar amounts of N,N'-dimethyl piperazine can be used with equal sucess.

EXAMPLE 8

29.2 g. of finely pulverized ethylenediamine-N,N,N',N'-tetraacetic acid are added to 2200 g. of acetic acid anhydride at 60° and the whole is heated for 30 minutes at 120° while stirring. The reaction temperature is kept between 118–120°. The ethylenediamine-N,N,N',N'-tetraacetic acid dissolves more and more and the reaction mixture becomes darker and darker. After 8 hours, the mixture is filtered at 100° and the residue is washed with acetic acid anhydride. The residue of 8 g. consist entirely of non-reacted ethylenediamine-N,N,N',N'-tetraacetic acid and it can be used again for the next batch. The filtrate is kept for 2 days at 0° whereupon 10.5 g. of 1,2-bis-[2,6-dioxo-morpholinyl-(4)]-ethane precipitate in the form of yellow crystals. They are filtered off, M.P. 186°. This second filtrate is concentrated by degrees whereupon another 1.6 g. of 1,2-bis-[2,6-dioxo-morpholinyl-(4)]-ethane are obtained. The yield is 65.4% calculated on the ethylenediamine-N,N,N',N'-tetraacetic acid reacted. On recrystallising the 1,2-bis-[2,6-dioxo-morpholinyl-(4)]-ethane from acetonitrile, its melting point rises to 195°.

EXAMPLE 9

N,N-bis-(β[2,6-dioxo-morpholinyl-(4)]-ethyl)-N-carboxymethylamine

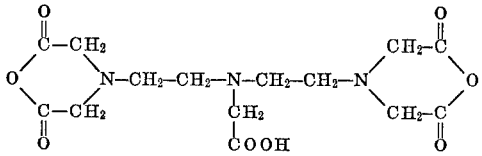

314.8 g. of N''-carboxymethyl-diethylenetriamine-N,N,N',N'-tetraacetic acid, 490 g. of acetic acid anhydride and 410.8 g. of pyridine are stirred for 48 hours at 60° and then the reaction mixture is filtered at room temperature. The residue is washed free of pyridine with acetic acid anhydride and then with benzene and is dried as in Example 1. 272 g. of N,N-bis-(β-[2,6-dioxo-morpholinyl-(4)]-ethyl)-N-carboxymethylamine are obtained. The yield is 95.2% of the theoretical, M.P. 172°.

When stirring with an oscillatory mixer and heating the reaction mixture to 125°, 264 g. of the final product are obtained within a reaction time of 5 minutes.

*Analysis.*—($C_{14}H_{19}N_3O_8$); molecular weight: 357.31. Calculated (percent): C, 47.06; H, 5.36; N, 11.76; O, 35.82. Found (percent): C, 47.39; H, 5.33; N, 11.63; O, 35.65.

Similar results are obtained if, instead of the 410.8 g. of pyridine equimolar amounts of tributylamine, N-methyl morpholine or 5-ethyl-2-methyl pyridine are used and/or instead of the 490 g. of acetic acid anhydride, the equimolar amount of propionic acid anhydride is used and otherwise the procedure given in the example is followed.

EXAMPLE 10

1,4-bis-[2,6-dioxo-morpholinyl-(4)]-benzene

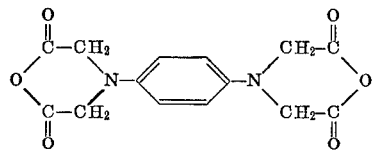

102 g. of 1,4-phenylenediamine-N,N,N',N'-tetraacetic acid, 184.5 g. of acetic acid anhydride and 156 g. of pyridine are stirred for 24 hours at 65°, the whole is then cooled to 5° and filtered. The residue is washed with acetic acid anhydride and then with diethyl ether until it has no longer any smell, and dried in vacuo. 66 g. of 1,4-bis-[2,6-dioxo-morpholinyl-(4)]-benzene are obtained as pale brown crystals. The yield is 72.5% of the theoretical, M.P. over 300°.

*Analysis.*—($C_{14}H_{12}N_2O_6$); molecular weight: 304.25. Calculated (percent): C, 55.26; H, 3.98; N, 9.21; O, 31.55. Found (percent): C, 54.95; H, 4.05; N, 9.15; O, 30.88.

If, in this example, the 156 g. of pyridine are replaced by equimolar amounts of 2-methyl-5-ethyl pyridine or N-methyl morpholine, then the same end product is obtained.

EXAMPLE 11

60.8 g. of 1,4-phenylenediamine-N,N,N',N'-tetraacetic acid are added to 2500 g. of acetic acid anhydride and the reaction temperature is kept for 20 hours between 117–120°. During this time the acid slowly dissolves and the colour of the reaction mixture becomes darker and and darker. The reaction mixture is filtered at 100° and the residue is well washed with diethyl ether and dried. 31. g. of 1,4-bis-[2,6-dioxo-morpholinyl-(4)]-benzene are obtained as a brown powder in a yield of 51% of the theoretical, M.P. over 300°.

*Analysis.*—($C_{14}H_{12}N_2O_6$); molecular weight: 304.25. Calculated (percent): N, 9.21; O, 31.53. Found (percent): N, 9.26; O, 31.34.

The compounds produced according to Examples 10 and 11 are identical.

EXAMPLE 12

1,3-bis-[2,6-dioxo-morpholinyl-(4)]-benzene

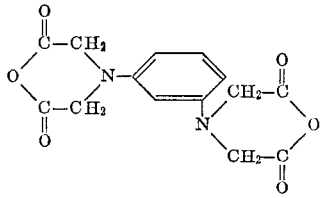

34 g. of 1,3-phenylenediamine-N,N,N',N'-tetraacetic acid, 72 g. of acetic acid anhydride and 39 g. of pyridine are stirred for 27 hours at 65°; the mixture is then filtered at 10° and well washed with benzene. After drying, 14.6 g., of 1,3-bis-[2,6-dioxo-morpholinyl-(4)]-benzene are obtained as a pale brown residue, M.P. over 300°.

*Analysis.*—($C_{14}H_{12}N_2O_6$); moleclar weight: 304.25. Calculated (percent): C, 55.26; H, 3.98; N, 9.21; O, 31.55. Found (percent): C, 55.03; H, 3.94; N, 9.23; O, 31.30.

The filtrate is concentrated to dryness and another 14 g. of 1,3-bis-[2,6-dioxo-morpholinyl-(4)]-benzene are obtained therefrom. The yield is thus 93.5% of the theoretical.

If in the above example, instead of the 34 g. of 1,3-phenylenediamine-N,N,N',N'-tetraacetic acid, equimolar amounts of 4,4'-diaminodiphenyl ether-N,N,N',N'-tetracetic acid,
3,3'- or 4,4'-diaminodiphenyl sulphone-N,N,N',N'-tetraacetic acid,
4,4'-diaminodiphenylmethane-N,N,N',N'-tetraacetic acid,
2,2-bis-(p-aminophenyl)-propane-N,N,N',N'-tetraacetic acid or
4,4'-diaminobenzophenone-N,N,N',-N'-tetraacetic acid are used under otherwise the same conditions, then 4,4'-[2,6-dioxo-morpholinyl-(4)]-diphenyl ether, or
3',3- or 4,4'-bis-[2,6-dioxo-morpholinyl-(4)]-diphenyl sulphone, or
4,4'-[2,6-dioxo-morpholinyl-(4)]diphenyl ether, or
2,2-bis-[p-(2,6-dioxo-morpholinyl-(4))-phenyl]-propane or
4,4'-bis-[2,6-dioxo-morpholinyl-(4)]-benzophenone respectively is obtained.

The melting points of these end products are all over 300° and the yields vary between 65 and 95% of the theoretical.

EXAMPLE 13

1,3-bis[2,6-dioxo-morpholinyl-(4)]-propane

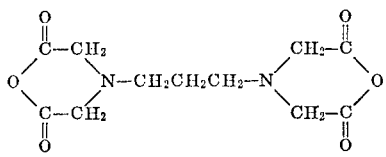

46 g. of 1,3-propylenediamine-N,N,N',N'-tetraacetic acid, 76 g. of acetic acid anhydride and 56.4 g. of pyridine are stirred for 24 hours at 65° whereupon the reaction product dissolves and no longer precipitates. This solution is evaporated in a rotatary evaporator at 100° under 1 torr to dryness. The residue is then pulverised and slurried in diethyl ether, filtered off and again well dried. 35.5 g. of 1,3-bis-[2,6-dioxo-morpholinyl-(4)]-propane are obtained, M.P. 77–80°. The yield is 87.5% of the theoretical.

*Analysis.*—($C_{11}H_{14}N_2O_6$); molecular weight: 270.24. Calculated (percent): C, 48.89; H, 5.23; N, 10.36; O, 35.52. Found (percent): C, 49.17; H, 5.41; N, 10.59; O, 35.37.

If propionic acid anhydride is used instead of acetic acid anhydride then, at a reaction temperature of 65°, the same yield is obtained when the duration of the reaction is increased to 40 hours. Pyridine can be replaced with equal success by tributylamine or N-methyl morpholine.

EXAMPLE 14

1,2-bis-[2,6-dioxo-morpholinyl-(4)]-propane

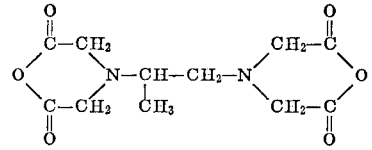

38.3 g. of 1,2-propylenediamine-N,N,N',N'-tetraacetic acid, 52.5 g. of acetic acid anhydride and 59 g. of pyridine are stirred for 24 hours at 60°. Even after 3 hours, the reaction mixture becomes a solution and no precipitate is formed even when the solution is concentrated by degrees. 31 g. of crude 1,2-bis-[2,6-dioxo-morpholinyl-(4)]-propane are obtained as distillation residue. It is recrystallised from acetonitrile and then melts at 130°.

By repeating the above example, but using instead of 38.3 g. of 1,2 - propylenediamine-N,N,N',N'-tetraacetic acid 45.0 g. of N''-ethyl-diethylenetriamine-N,N,N',N'-tetraacetic acid and otherwise following the procedure given in the above example, 32.4 g. of the compound of the formula

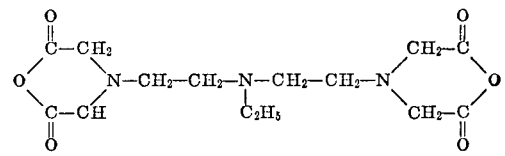

are obtained (yield rate 79.1%).

EXAMPLE 15

1,6-bis-[2,6-dioxo-morpholinyl-(4)]-hexane

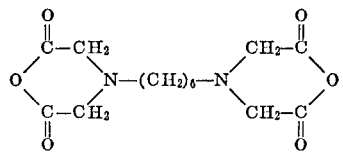

34.8 g. of 1,6-hexyleneamine-N,N,N',N'-tetraacetic acid, 51 g. of acetic acid anhydride and 37.6 g. of pyridine are stirred for 22 hours at 60° and then 1.5 g. of 1,6-hexylenediamine-N,N,N',N'-tetraacetic acid are filtered off. The filtrate is evaporated to dryness in a rotatory evaporator at 60° under torr. The brown residue is finely pulverised and extracted with diethyl ether. 26 g. of 1,6-bis-[2,6-dioxomorpholinyl-(4)]-hexane are obtained as part insoluble in diethyl ether; M.P. 103–104°. The yield is 83.2% of the theoretical.

*Analysis.*—($C_{14}H_{20}N_2O_6$); molecular weight: 312.32. Calculated (percent): C, 53.84; H, 6.45; N, 8.97; O, 30.74. Found (percent): C, 53.61; H, 6.49; N, 8.88; O, 30.84.

If quinoline or N-methyl morpholine are used instead of pyridine and otherwise the procedure given in the example is followed, then the same end product is obtained.

EXAMPLE 16

1,12-bis-[2,6-dioxo-morpholinyl-(4)]-dodecane

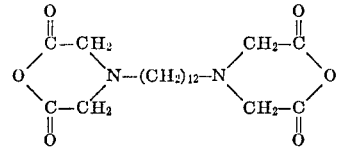

65 g. of 1,12-dodecylenediamine-N,N,N',N'-tetraacetic acid, 32 g. of acetic acid anhydride and 7.9 g. of pyridine are stirred for 42 hours at 60°. The reaction mixture is filtered and the residue is worked up as described in Example 15. 45.7 g. of 1,12-bis-[2',6'-dioxo-morpholinyl-(4')]-dodecane are obtained in a yield which is 76.9% of the theoretical.

Analysis.—($C_{20}H_{32}N_2O_6$); molecular weight: 396.47. Calculated (percent): C, 60.58; H, 8.14; N, 7.07; O, 24.21. Found (percent): C, 60.13; H, 7.80; N, 6.80; O, 24.69.

If, instead of the 65 g. of 1,12 - dodecylenediamine-N,N,N',N'-tetraacetic acid, equimolar amounts of 1,20-eicosylenediamine-N,N,N',N'-tetraacetic acid are used then, with otherwise the same procedure as given in the example, 1,20 - bis-[2,6-dioxo-morpholinyl-(4)]-eicosane is obtained.

EXAMPLE 17

β,β'-bis-[2,6-dioxo-morpholinyl-(4)]-diethyl ether

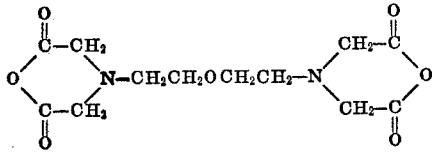

53 g. of β,β'-diaminodiethyl ether-N,N,N',N'-tetraacetic acid, 71.4 g. of acetic acid anhydride and 7.9 g. of pyridine are stirred for 48 hours at 60°. Complete solution is attained after only 5 hours. The reaction mixture is concentrated in a rotatory evaporator to dryness at 80° under 1 torr. The brown residue is pulverised and dried for 48 hours over phosphorus pentoxide at 60° under 0.1 torr. 42.5 g. of 3,3'-bis-[2,6-dioxo-morpholinyl-(4)]-diethyl ether are obtained, M.P. 90°. The yield is 94.5% of the theoretical.

Analysis.—($C_{12}H_{16}N_2O_7$) molecular weight: 300.26. Calculated (percent): C, 48.00; H, 5.38; N, 9.32 O, 37.29. Found (percent): C, 48.03; H, 5.70; N, 9.43; O, 37.55.

If 56.2 g. of β,β'-diaminodiethyl thioether-N,N,N',N'-tetraacetic acid are used instead of the 53 g. of β,β'-diaminodiethyl ether-N,N,N',N'-tetraacetic acid and the procedure given in this example is followed, then β,β'-bis-[2,6-dioxo-morpholinyl-(4)] - diethyl thioether is obtained.

EXAMPLE 18

Ethylene glycol-bis-(β-[2,6-dioxo-morpholinyl-(4)]-ethyl) ether

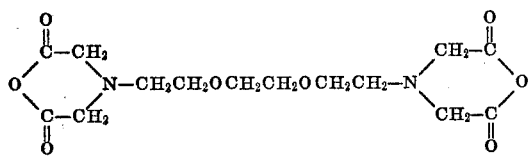

57 g. of ethylene glycol-bis-(β-aminoethyl)-ether-N,N,N',N'-tetraacetic acid, 72 g. of acetic acid anhydride and 7.9 g. of pyridine are stirred for 142 hours at 60°. The reaction mixture is then filtered hot and the residue is washed with acetic acid anhydride. According to the results of analysis, the 40 g. of residue consist of pure ethylene glycol-bis-(β-aminoethyl)-ether - N,N,N',N'-tetraacetic acid. The filtrate is concentrated in a rotatory evaporator at 60° under 1 torr and well dried. 15 g. of ethylene glycol-bis-(β-[2,6 - dioxo-morpholinyl - (4)]-ethyl)-ether are obtained as a dark brown viscous mass. Refractive index $n_D^{40}$=1.5144. The yield is 97.4% calculated on the reacted ethylene glycol-bis-(β-aminoethyl)-ether-N,N,N',N'-tetraacetic acid.

Analysis.—($C_{14}H_{20}N_2O_8$); molecular weight: 344.32. Calculated (percent): C, 48.84; H, 5.85; N, 8.14; O, 37.17. Found (percent): C, 49.21; H, 6.10; N, 8.27; O, 36.53.

EXAMPLE 19

1,4-bis-([2,6-dioxo-morpholinyl-(4)]-methyl)-cyclohexane

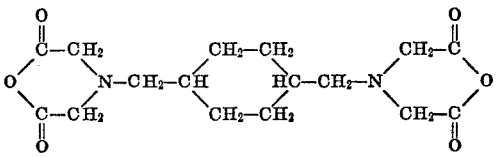

93.6 g. of 1,4-bis-(aminomethyl)-cyclohexane-N,N,N',N'-tetraacetic acid, 128 g. of acetic acid anhydride and 79 g. of pyridine are stirred for 24 hours at 60°. The mixture is then filtered hot and the residue is washed. 20 g. of 1,4-bis-([2,6-dioxo-morpholinyl-(4)]-methyl)-cyclohexane are obtained as residue. M.P. 188°. After recrystallisation from acetonitrile, the melting point of this compound rises to 189°. A further 50.1 g. of 1,4-bis - 6[2,6-dioxo-morpholinyl-(4)]-methyl)-cyclohexane are isolated by concentrating the filtrate. The yield is 91.8% of the theoretical.

Analysis.—($C_{16}H_{22}N_2O_6$); molecular weight: 338.35. Calculated (percent): C, 56.79; H, 6.55; N, 8.23; O, 28.38. Found (percent): C, 56.99; H, 6.69; N, 8.53; O, 27.93.

If 92 g. of 1,4 - bis-(aminomethyl)-benzene-N,N,N',N'-tetraacetic acid or 106 g. of 1,4-bis-(aminomethyl)-2,3,5,6 - tetramethylbenzene - N,N,N',N' - tetraacetic acid are used instead of 1,4-bis-(aminomethyl)-cyclohexane-N,N,N',N'-tetraacetic acid, then with otherwise the procedure given in this example, 1,4 - bis - ([2,6 - dioxo-morpholinyl - (4)] - methyl) - benzene or 1,4 - bis-([2,6 - dioxo - morpholinyl) - (4)]-methyl-2,3,5,6-tetramethyl-benzene respectively are obtained.

EXAMPLE 20

Bis-(4-[2,6-dioxo-morpholinyl-(4)]-cyclohexyl)-methane

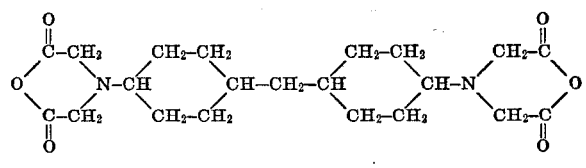

15.5 g. of p,p'-diamino-dicyclohexylmethane-N,N,N',N'-tetraacetic acid, 17.9 g. of acetic acid anhydride and 11.2 g. of pyridine are stirred for 48 hours at 60°. Even after 3½ hours, the reaction mixture has become a solution. All volatile components are removed in a rotatory evaporator at 70° under 0.1 torr and then the residue is well dried. The latter consists of 13.4 g. of bis-(4-[2,6-dioxo-morpholinyl - (4)] - cyclohexyl)-methane, M.P. 127°. The yield is 94.5% of the theoretical.

Analysis.—($C_{21}H_{30}N_2O_6$); molecular weight: 406.47. Calculated (percent): C, 62.07; H, 7.44; N, 6.89; O, 23.63. Found (percent): C, 61.65; H, 7.78; N, 6.69; O, 23.97.

If in this example the 15.5 g. of p,p'-diamino-dicyclohexylmethane-N,N,N',N'-tetraacetic acid are replaced by 15.5 g. of p,p'-diamino-dicyclohexyl ether-N,N,N',N'-tetraacetic acid or by 12.2 g. of 1,3- or 1,4-diaminocyclohexane - N,N,N',N' - tetraacetic acid, or an equivalent, amount of p,p'-diamino-dicyclohexyl sulphide-N,N,N',N'-tetraacetic acid, then with otherwise the same procedure, bis-[2,6 - dioxo-morpholinyl - (4)]-cyclohexyl)-ether, 1,3- or 1,4-[2,6 - dioxo-morpholinyl - (4)]-cyclohexane or bis-([2,6 - dioxomorpholinyl-(4)]-cyclohexyl)-sulphide, respectively, are obtained.

EXAMPLE 21

1,4-bis-(3-[2,6-dioxo-morpholinyl-(4)]-propyl)-piperazine

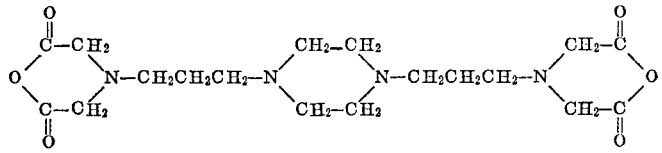

43.2 g. of 1,4 - bis-(3' - aminopropyl)-piperazine-N,N,N',N'-tetraacetic acid, 63 g. of acetic acid anhydride and 40.4 g. of N-methyl morpholine are stirred for 24 hours at 65°. The reaction mixture is then heated in a rotatory evaporator at 70° under 1 torr until all volatile components have been removed. The residue consists of 34.1 g. of 1,4-bis-(3-[2,6-dioxomorpholinyl-(4)]-propyl)-piperazine. The yield is 86.5% of the theoretical.

Analysis.—($C_{18}H_{28}N_4O_6$); molecular weight: 396.46. Calculated (percent): C, 54.52; H, 7.12; N, 14.14; O, 24.22. Found (percent): C, 54.82; H, 7.27; N, 14.02; O, 23.87.

EXAMPLE 22

4,4'-bis-[2,6-dioxo-morpholinyl-(4)]-diphenyl

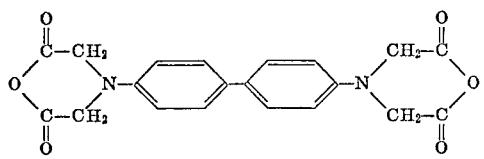

41.6 g. of 4,4'-diaminodiphenyl-N,N,N',N'-tetraacetic acid, 61 g. of acetic acid anhydride and 37.5 g. of pyridine are added together at 25° whereupon the temperature of the mixture rises to 42°. This reaction mixture is then stirred for 24 hours at 60°, then filtered hot and the residue is washed. As residue, 31.1 g. of 4,4'-bis-[2,6-dioxo-morpholinyl-(4)]-diphenyl are obtained; M.P. over 300°. The yield is 83.5% of the theoretical.

Analysis.—$C_{20}H_{16}N_2O_6$; molecular weight: 380.40. Calculated (percent): C, 63.15; H, 4.27; N, 7.37; O, 25.21. Found (percent): C, 62.75; H, 4.43; N, 7.53; O, 24.53.

When repeating the above Example 22, but replacing the 41.6 g. of 4,4'-diaminodiphenyl-N,N,N',N'-tetraacetic acid by 47.6 g. of 4,4'-diamino-3,3'-dimethoxy-diphenyl-N,N,N',N'-tetraacetic acid, there is obtained 4,4'-bis-[2,6 - dioxomorpholinyl-(4)]-3,3'-dimethoxy-diphenyl in a yield rate of 81.4%. The melting point of this compound is above 300°.

EXAMPLE 23

10 g. of 2,2 - bis-[p - (2,3-epoxy)-propyloxyphenyl]-propane having an epoxyd content of 8.2% (Araldit F, Ciba, Basle, cf. Chimia 19, 360, (1965)) and 0.2 ml. of tributylamine are mechanically stirred in a boiling flask at 140°. 0.5 g. of 1,2-bis-[2,6-dioxo-morpholinyl-(4)]-ethane (produced according to Example 1) are added in portions at this temperature, the addition being made within 30 minutes. It is added in portions so that a solution will be attained quickly. Before this reaction mixture becomes viscous, it is poured into an iron container and then heated in an oven, first for 6 hours at 140°, then for 9 hours at 150°, for 4 hours at 180° and, finally, for 7 hours at 210°. A transparent product is obtained which melts at over 100°.

In 10 g. of 2,2-bis-[p-(2,3-epoxy)-propyloxyphenyl]-propane as well as in a mixture of 10 g. of 2,2-bis-[p-(2,3-epoxy)-propyloxyphenyl]-propane and 0.2 ml. of tributylamine, the known curing agent, pyromellitic acid dianhydride is insoluble and, therefore, cannot be used therein.

EXAMPLE 24

10 g. of 2,2 - bis-[p - (2,3-epoxy)-propyloxyphenyl]-propane and 0.1 ml. of tributylamine are heated to 120° and 0.5 g. of 1,3-bis-[2,6-dioxo-morpholinyl-(4)]-benzene (produced according to Example 12) are added within 90 minutes. The reaction product is then heated first for 24 hours at 120°, then for 12 hours at 150° and finally for 16 hours at 180°. A hard, solid, transparent mass is formed which melts at over 100°.

EXAMPLE 25

8 g. of 1-epoxyethyl-3,4-epoxycyclohexane (vinyl cyclohexene dioxide) and 0.1 g. of trioctylamine are heated at 110°. 1 g. of 1,2 - bis-[2,6-dioxo-morpholinyl-(4)]-ethane is added in portions within 15 minutes and then the whole is heated, first for 20 hours at 115–135°, then for 9 hours at 150°, for 5 hours at 170°, and finally for 7 hours at 210°. A flexible transparent mass is obtained which melts at over 100°.

If 0.2 g. of trioctylamine, 0.2 g. of N-ethyl morpholine or 0.2 g. of N,N-dimethylbenzylamine are used instead of 0.1 g. of tributylamine then, with otherwise the procedure given in this example, a clear resin is obtained which melts at over 100°.

EXAMPLE 26

0.2 g. of 1,6-bis-[2,6-dioxo-morpholinyl-(4)]-hexane (produced according to Example 15) are dissolved in 8 g. of 1-epoxyethyl-3,4-epoxycyclohexane and 0.1 ml. of tributylamine at 120°. The solution is then heated for 24 hours at 120°, then for 12 hours at 150°, then for 6 hours at 180°, and finally for 15 hours at 210°. A transparent mass is obtained which melts at over 100°.

EXAMPLE 27

10 g. of 1 - epoxyethyl-3,4-epoxycyclohexane and 0.1 ml. of tributylamine are heated to 120° and 0.9 g. of 1,4-bis-[2,6-dioxo-morpholinyl-(4)]-benzene, (produced according to Example 10) are added within 30 minutes. The whole is then heated for 9 hours at 120°, then for 8 hours at 160° and finally for 12 hours at 210°. A hard, transparent resin is obtained which melts at over 100°.

EXAMPLE 28

10 g. of epoxyethyl-3,4-epoxycyclohexane and 0.1 ml. of tributylamine are heated at 120°. 0.6 g. of N,N-bis-(β-[2,6-dioxo - morpholinyl - (4)] - ethyl) - N - carboxymethylamine (produced according to Example 9) are added within 1 hour and the whole is heated for 6 hours at 140°, then for 9 hours at 150°, then for 5 hours at 170° and finally for 7 hours at 210°. A hard resin is obtained.

In contrast thereto, the known curing agent, pyromellitic acid dianhydride is insoluble both in 1-epoxyethyl-3,4-epoxycyclohexane as well as in a mixture of 1-epoxyethyl-3,4-epoxycyclohexane and tributylamine.

EXAMPLE 29

10 g. of 2,2-bis-[p - (2,3-epoxy) - propyloxyphenyl]-propane and 0.1 ml. of 2,4,6-tri-(dimethylaminomethyl)-phenol are heated at 120°. 0.15 g. of 1,2-bis-[2,6-dioxo-morpholinyl-(4)]-ethane are added within 30 minutes and then the reaction mixture is heated first for 24 hours at 120°, then for 24 hours at 150° and finally for 12 hours at 180°. A transparent hard resin is obtained which melts at over 100°.

EXAMPLE 30

8 g. of dipentene dioxide (limonene dioxide) and 0.1 ml. of tributylamine are heated at 120°. At this temperature, 0.6 g. of 1,2-bis-[2,6-dioxo-morpholinyl-(4)]-ethane are added in portions within 110 minutes. The reaction mixture is then heated for 5 hours at 120°, then for 8 hours at 150° and finally for 12 hours at 210°. A hard, transparent resin is formed which melts at over 100°.

EXAMPLE 31

10 g. of 3,4-epoxyhexahydrobenzal - 3',4' - epoxy-1',1'-bis-(oxymethyl)-cyclohexane (Araldit CY 175, Ciba, Basle, cf. Chimia 19, 360 (1965)) are mixed with 0.2 ml. of tributylamine at 120°. At this temperature, 1 g. of 1,2-bis-[2,6 - dioxo - morpholinyl - (4)] - ethane dissolved in 5 g. of cyclohexanone are added within 15 minutes and the whole is then heated in a vacuum oven under 100 torr for 24 hours at 120°, then for 24 hours at 150°, then for 24 hours at 180° and finally for 6 hours at 210°. A transparent resin is formed which melts at over 100°.

EXAMPLE 32

10 g. of 3,4 - epoxyhexahydrobenzal - 3',4' - epoxy-1',1' - bis - (oxymethyl) - cyclohexane (Araldit CY 175, Ciba, Basle; cf. Chimia 19, 360 (1965)) and 0.2 ml. of tributylamine are heated at 120°. A solution consisting of 1 g. of 1,6 - bis - [2,6 - dioxo-morpholinyl-(4)]-hexane (produced according to Example 15) and 5 g. of dimethyl acetamide is added within 15 minutes and this reaction mixture is cured exactly as described in Example 31. A transparent resin which melts at over 100° is obtained.

EXAMPLE 33

10 g. of 3,4 - epoxy - 6 - methyl-cyclohexyl adipate having an epoxyd content of 7.8% (Araldit CY 178, Ciba, Basle; cf. Chimia 16, 57–66 (1963)) are heated at 120°, 0.2 ml. of tributylamine are then added after which 1 g. of 1,3-bis-[2,6 - dioxo - morpholinyl - (4)] - benzene (produced according to Example 12) are added to the mixture obtained within 30 minutes. The mixture is then heated for 24 hours at 120°, then for 12 hours at 150°, then for 16 hours at 180° and finally for 8 hours at 210°. A hard resin which melts at over 100° is obtained.

If the method given in this example is used except that 1,3 - bis - [2,6 - dioxo - morpholinyl - (4)] - benzene is replaced by the known curing agent pyromellitic acid dianhydride, then no curing takes place. Pyromellitic acid dianhydride is insoluble in 3,4-epoxy-6-methyl-cyclohexyl adipate.

EXAMPLE 34

A pentaglycidyl ether is produced as starting product by adding 219 g. of 2,2,6-6-tetramethylol cyclohexanol to 465 g. of epichlorohydrin at 60° in the presence of 8 g. of $BF_3$ etherate. The addition product obtained is condensed with sodium hydroxide in an organic solvent to form the corresponding 1,2,2,6,6-penta-2,3-epoxy-propyl ether. According to analysis, this product contains 10.7% of epoxyd. 10 g. of this penta-2,3-epoxy-propyl ether are heated at 115°, then 0.2 ml. of tributylamine are added and 0.3 g. of 1,2-bis-[2,6-dioxo-morpholinyl-(4)]-ethane are added to the mixture obtained within 5 minutes. The mixture obtained is heated for 4 hours at 120°, then for 9 hours at 150°, then for 5 hours at 170° and finally for 7 hours at 210°. A transparent resin which melts at over 100° is obtained.

EXAMPLE 35

10 g. of 2,2 - bis - [p - (2,3-epoxy)-propyloxyphenyl]-propane are heated at 120°, 0.2 ml. of tributylamine are added and 0.5 g. of 4,4' - bis - [2,6 - dioxo-morpholinyl-(4)]-diphenyl (produced according to Example 22) are added in portions to the mixture within 30 minutes. The reaction mixture is then heated for 24 hours at 120°, then for 24 hours at 150° and finally for 12 hours at 180°. A transparent resin which melts at over 100° is obtained.

EXAMPLE 36

8 g. of p-(2,3 - epoxy - propyloxy) - toluene having an epoxyd content of 8.9%, and 0.2 ml. of tributylamine are heated at 100° and, within 2 hours, 0.3 g. of 1,3-bis-[2',6' - dioxo - morpholinyl - (4')] - benzene (obtained accordinging to Example 12) are added. The reaction mixture is then heated for 24 hours at 120°, then for 16 hours at 150° and finally for 24 hours at 170°. A solid clear mass is formed which melts at over 80°.

If instead of 8 g. of p-(2,3-epoxy-propyloxy)-toluene, 7.1 g. of 1,2-epoxy-octane having an epoxyd content of 9.8% is used and otherwise the procedure given in the example is followed, then a solid transparent mass is also obtained.

I claim:

1. A compound of the formula

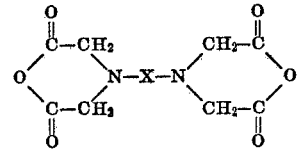

wherein X is phenylene, diphenylene, alkylene having from 2 to 6 carbon atoms, or the group

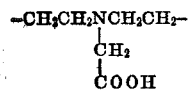

2. A compound as defined in claim 7, which is 1,2-bis-[2,6-dioxo-morpholinyl-(4)]-ethane.

3. A compound as defined in claim 7, which is 1,2-bis-[2,6-dioxo-morpholinyl-(4)]-propane.

4. A compound as defined in claim 7, which is N,N-bis-(β-[2,6-dioxo-morpholinyl-(4)]ethyl) - N - carboxymethylamine.

5. A compound as defined in claim 8, which is 1,3-bis-[2,6-dioxo-morpholinyl-(4)]-benzene.

6. A compound as defined in claim 8, which is 4,4'-bis-[2,6-dioxo-morpholinyl-(4)]-diphenyl.

7. A compound of claim 1 wherein X is alkylene having from 2 to 6 carbon atoms or the group

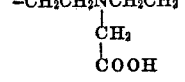

8. A compound of claim 1 wherein X is phenylene or diphenylene.

No references cited.

ALEX MAZEL, Primary Examiner

J. TOVAR, Assistant Examiner

U.S. Cl. X.R.
260—47 EA, 47 EN